Nov. 25, 1969    J. J. KOTTMAN    3,480,786
FLAW DETECTING SYSTEM INCLUDING SYNCHRONOUSLY
ROTATING OPTIC FIBER TUBES
Filed Jan. 13, 1966    2 Sheets-Sheet 1

INVENTOR
JOSEPH J. KOTTMAN
BY
Henry W. Coughlin
ATTORNEY

INVENTOR
JOSEPH J. KOTTMAN
BY
Henry W. Coughlin
ATTORNEY

United States Patent Office 3,480,786
Patented Nov. 25, 1969

3,480,786
FLAW DETECTING SYSTEM INCLUDING SYNCHRONOUSLY ROTATING OPTIC FIBER TUBES
Joseph J. Kottman, Binghamton, N.Y., assignor to GAF Corporation, New York, N.Y., a corporation of Delaware
Filed Jan. 13, 1966, Ser. No. 520,486
Int. Cl. G01n *21/30*
U.S. Cl. 250—219                                    1 Claim

ABSTRACT OF THE DISCLOSURE

Disclosed in this application is a flaw detecting system for travelling webs including a light transmitting fiber pipe mounted for rotation on one side of the travelling web and a light receiving fiber pipe mounted on the opposite side of the travelling web. The light pipes are mounted on a common axis and offset from the common axis to an equal extent with the light pipes rotating synchronously and in superimposed relation. The end of the light receiving pipe away from the travelling web is positioned adjacent a light sensitive means so that any variation in the light transmissive properties of the web passing between the rotating light pipes is sensed by the light sensitive means.

---

This invention pertains to the detection of optically detectable defects in a moving web of material. The invention employs an optic fiber to produce a "flying spot" of actinic radiation on the web and also to transmit an image of the flying spot passing through or reflected from the web to a receiver sensitive to variations in illumination which can record such variations and/or send out a signal when too-great variations are found.

The detection of optically detectable flaws in moving web materials presents a number of handicaps. For example, the detection of coating defects on photographic films during production poses difficult technical problems, the films being wet and sensitive to visible light. Fast scanning with infrared light is commonly considered the best method, but scanning with conventional means has a number of drawbacks, mainly involving the lack of speed and sensitivity of such systems. For example, a web of photographic film may be one meter or more wide and important defects may vary in size from one square millimeter to several hundred square centimeters. The differences in optical transmission or reflection associated with the defects usually are quite small, so that achievement of enough sensitivity to detect such defects has presented the art with severe technical problems not heretofore solved. The greatest problem appears to be the achievement of substantially uniform radiation intensity all across the web. For example, if light from a point source is spread out into a "line" for shining on the web to be examined, the differences in intensity between the mid-point and the ends of this line of illumination will have to be filtered out optically, electronically, etc., and such filtering may also filter out the transmission or reflectance variations which it is desired to detect. Likewise, an elongated light source almost always presents variations in illumination intensity along its length and such variations reduce the sensitivity of the scanning process in proportion to their extent.

A small scanning spot (flying spot) likewise may vary in the intensity of illumination brought to the web along its locus of travel. Further, a small scanning spot requires a flat and accurately positioned film surface, which can be found only on a roller or on specially designed film guides, e.g., flat film backings using air cushions. Also, a very rapid scanning is required if small errors are to be detected on wide, rapidly-moving films.

The techniques of "fiber optics" have not previously offered a solution to these multiple problems. Fiber optics technology employs elongated cylinders which have the characteristic property of conducting light energy along the length of the cylinder from end to end, regardless of the shape into which the cylinder may be bent. Such light-conducting cylinders may be made of quartz, or be a glass tube or rod coated on the cylinder surface with black enamel, mercury, etc. Generally, the cylinder is a solid rod made of a transparent plastic synthetic resin, usually polystyrene, polyvinyl chloride or polymerized acrylic acid esters sold under such trade names as Lucite, Plexiglas or the like. Rods of such material can be bent to almost any desired shape and will conduct visible or invisible actinic radiation from end to end with little loss of intensity. It will be readily understood that the use of such elongated solid light conductors enables equipment to be built which is usually far more compact than equipment where light must travel in a straight line or where a plurality of mirrors, etc., have to be included (and constantly adjusted, etc.) to provide a crooked light path.

In fiber optics technology as it has so far developed, however, the light conducting rods are generally provided in bundles containing quite a plurality of individual rods or optic fibers. It will be readily understood, however, that variations in length and in light-transmitting ability among the rods of a bundle are almost bound to occur when a great plurality of fibers are employed. Thus, the principles and practice of fiber optics is not usually employed where great optical sensitivity is required.

This invention employs an optically conductive rod to send a flying spot across a moving web, the defects of which are to be optically detected. Another optic fiber is employed to transmit the image of the spot passing through or reflected from the web to an optical sensing instrument; e.g., a photocell. In this manner a compact instrument succeeds in scanning a web of considerable width with a light spot which does not vary significantly in its intensity along its locus. The flying spot pivots about an axis in a generally arcuate pattern and in a preferred embodiment the locus of the spot on the web may be described as a flattened helix such as is obtained in a common penmanship exercise. Although a plurality of stationary fibers may be employed to transmit the image of the spot, it is preferable to use a single image-transmitting fiber for each spot-producing fiber. The transmitting fiber is synchronized in its pivoting, i.e., revolution or oscillation, with the spot-producing fiber and it thus may be considered that a single optic fiber is employed between light-source and sensing member, this fiber having a gap or discontinuity through which or closely adjacent to which (in a reflective disposition) the moving web passes.

In a preferred apparatus for carrying out this invention, both the light source and the sensing means are stationary and have a common axis. One or a small plurality of spot-producing bent fibers are provided along a like number of imagetransmitting bent fibers. The end of the fiber proximate the source of actinic radiation and the end of the fiber proximate the sensing member have means for synchronous rotation about the light source-sensing member axis, the movement of the remote ends, therefore being a circular revolution about this same axis. Where a single fiber is employed the proximate ends will be coaxial with the aforementioned axis. Where a small plurality of optic fibers are employed the proximate ends will revolve around the axis describing a circle of small radius while the circle described by the remote ends will be of far greater radius. Also, in such situation, the fibers will be substantially equidistant from the axis, that is, there will not be such variation among the fibers in their distance from the axis that the variation in actinic radiation intensity of the projected flying spot or the received image of the spot will be of the same order of magnitude as the variation in radiation intensity which is produced by the defects of the moving web which are to be detected. Preferably, as mentioned, each optic fiber is rotated continuously during operation of the device. The light passes through the web. Alternatively, the fibers may oscillate, say, through an arc of about 180°, and visual testing of the web may be reflection of the actinic radiation.

The invention will be better understood by reference to the accompany drawings in which.

Figure 1:
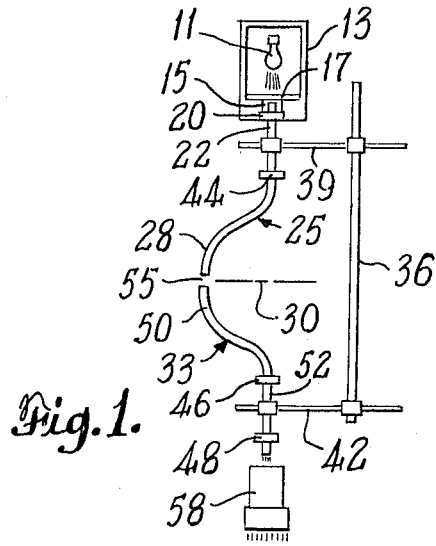
FIGURE 1 is a schematic showing the operation of this invention in which the fibers rotate and the web is optically tested by transmission of actinic radiation through the moving web.

Considering first FIGURE 1, light or other actinic radiation is provided by a source 11, such as a lamp which is held in the stationary housing 13. Radiation leaves the housing through passage 15 and, if desired, this passage may be provided with a light filter 17, say, to filter out all visible radiattion and transmit only the infrared rays. The passage 15 generally will include suitable journaling means 20 for rotatably holding the upper end 22 of the light conducting cylinder or optic fiber 25 proximate the radiation source 11.

As can be seen, the lower or remote end 28 of the optic fiber or conduit 25 is displaced laterally from the upper end 22 so that when the conduit is rotated about the axis of the light source 11, the lower remote end 28 passes through an arc which descirbes a circle having this axis as its center. The bottom of remote, laterally displaced portion 28 is close to the moving web 30 which is to be examined and, if desired, the bottom of portion 28 may be given a lens configuration for diffusion or concentration of the actinic radiation upon the moving web 30. As will be readily understood, this radiation produces a flying spot on the web which moves in a circular path. Suitable means are provided to rotate synchronously the spot-producing conduit 25 and the image-receiving conduit 33. Such means may include the rotating drive shaft 36, suitable means 39 and 42 for transmission of the rotation, and suitable journaling means 44, 46 and 48.

Image-receiving optic fiber 33 has a laterally displaced remote portion 50 and a straight portion 52 which is close to or at the axis of the radiation source 11. The end 55 of image conduit 33 is placed near the end of spot-producing conduit portion 28 in such fashion that light transmitted through web 30 is picked up by the end 55 and conducted through the optic fiber 33 to a light-sensing member, e.g., a photo-multiplier tube 58, which preferably is stationary and is coaxial with the light source 11.

As is apparent from this schematic, this invention may employ a single discontinuous light conduit or optic fiber to produce and trace a single flying spot on the moving web, the web being at the discontinuity or gap of the conduit. It will be apparent, however, that the provision of a number of radiation conduits, say about 2–8, will permit greater web speeds while still permitting a flying spot to hit all areas of the web. Such number will rarely need to be above eight and, as can be seen from FIGURES 2 and 3, an apparatus having four complete light conduits is satisfactory for a web nine inches wide moving at about 80 feet per minute. This apparatus advantageously will provide rotation of the conduits at about 1800 to 3600 r.p.m. to cover 100% of the area to be examined.

Figure 2:
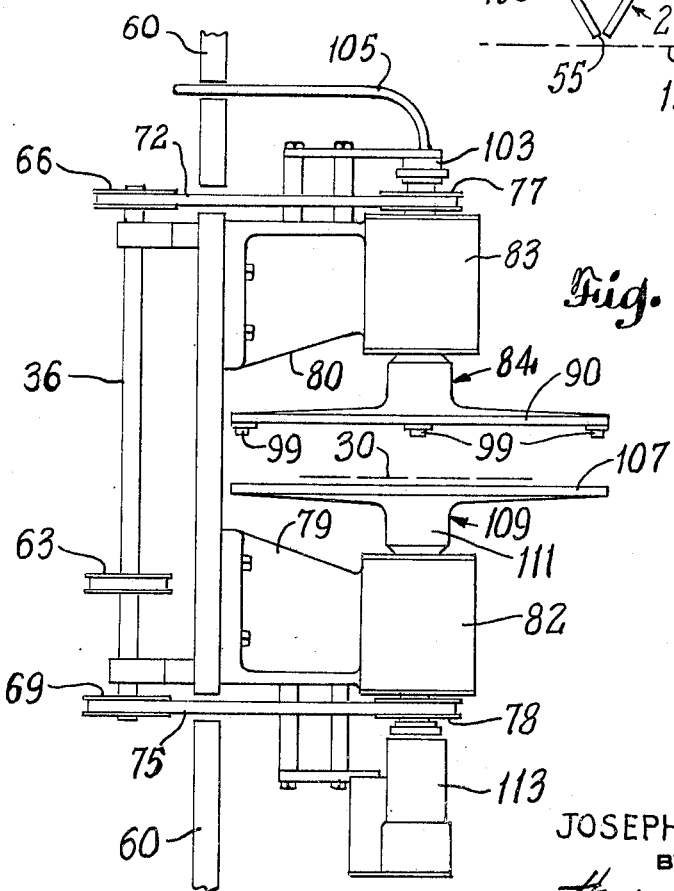
FIGURE 2 shows apparatus suitable for use in this invention using light transmission for the testing.
Figure 3:
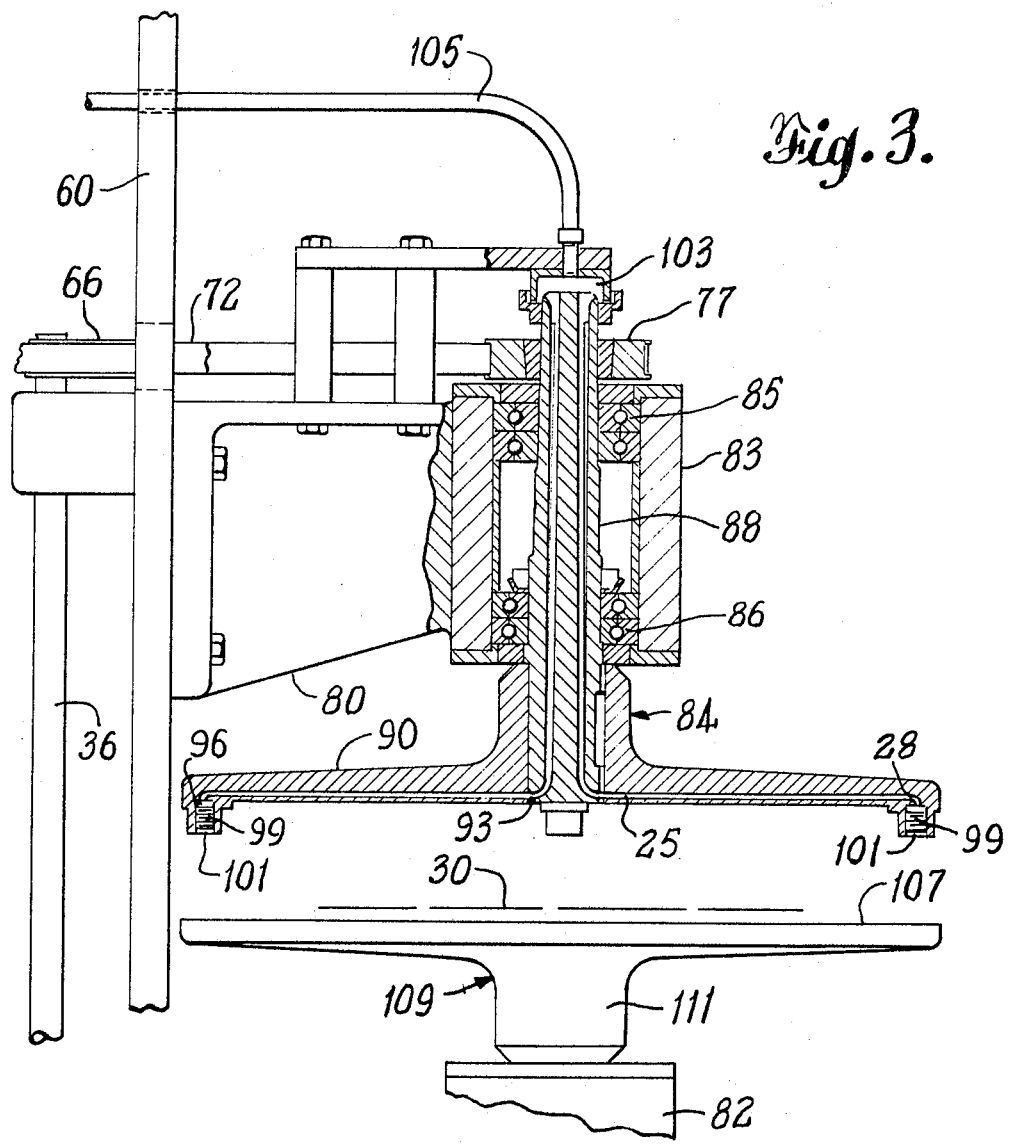
FIGURE 3 is a partly cut-away view of the device of FIGURE 2.

In the apparatus of FIGURES 2 and 3 a support standard 60 bears drive shaft 36 which is provided with suitable means, e.g., pulley 63, for reception of torque and suitable means, e.g., pulleys 66 and 69 and timing belts 72 and 75, to transmit the torque to the rotating image conduits, e.g., through the pulleys 77 and 78.

The support standard 60 also holds brackets 79 and 80 on which are mounted the lower and upper bearing supports 82 and 83, respectively. Rotatably held in the upper bearing support 83 is the conduit holder 84. Bearings 85 and 86 may be used for this purpose. As can be seen, this conduit holder comprises an elongated neck portion 88 and a flattened disc portion 90 which together form several channels 93 for the reception of light-conduits such as 25. In the neck portion 88 the upper portion 22 of conduit 25 is more-or-less parallel with the axis of rotation of the holder 86. The disc portion 90 provides annular openings 96, each of which may suitably be provided with the lens holder 99 and the lens 101 to which the laterally displaced portion 28 of the conduit 25 may lead. The end of this conduit usually is ground and polished, with all voids filled with a suitable light-transmitting material such as epoxy resin.

Radiation may be transmitted to the upper, proximate, ends of the conduits 25 through a suitable chamber 103 to which light is introduced by another optic fiber 105, from a suitable source of actinic radiation, not shown in these figures.

As can be seen in these figures, the web 30 which is to be examined, passes between the upper disc portion 90 and the disc portion 107 of the lower scanning member 109. This lower scanning member is similar to the upper scanning member 86 and contains the same number of optic fibers as the upper member. These fibers lead through a throat portion 111 to the stationary photomultiplier tube contained within the housing 113. It will be observed that sensing means 113 and radiation source 103 both are stationary and between them define the axis around which the flying spot produced by the remote end 28 of conduit 25 and received by the remote end 55 of conduit 33 describes a circle.

It can readily be seen that the optic fibers contained in the upper scanning member 86 are substantially identical in length thus providing substantial evenness of illumination or other radiation intensity on the web. Also, the image-receiving conduits in lower scanning member 109 are substantially identical in length; also the flying spot produced on the web is at all times substantially the same distance from the light source and at all times substantially the same distance from the sensing means. Thus, means to overcome variations in intensity of radiation stemming from the apparatus will rarely need to be employed and the photomultiplier tube may respond directly to intensity variations caused by imperfections in the web.

Figure 4:
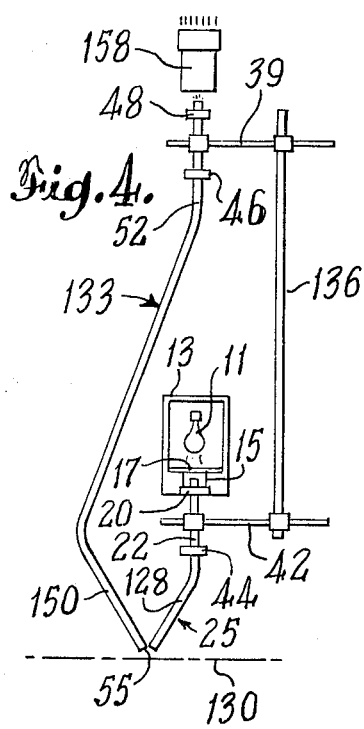
FIGURE 4 is an alternative embodiment in which the fibers oscillate and testing is performed by reflecting radiation from the web.

FIGURE 4 shows an embodiment of this invention employing radiation reflectance and an oscillating flying spot, rather than radiation transmission and a rotating flying spot. In this embodiment, the lower end 128 of optic fiber 25 is directed toward the web 130 in a position to reflect light from the web to the image receiving conduit 133. Drive shaft 136 oscillates, rather than rotates, the motion being transmitted by means as in FIGURE 1. Thus, remote portion 150 of optic fiber 133 oscillates in synchronization with portion 25 to carry the reflected image to light-sensitive member 158 which, as in FIGURE 1, is coaxial with light source 11, although placed above it.

What is claimed is:

1. A flaw detecting system for a strip of moving material including a stationary source of actinic radiation and a stationary means sensitive to variations in intensity of actinic radiation, said stationary elements having a common axis, a spot-producing bent optic fiber and an image receiving bent optic fiber, said spot producing fiber having one end adjacent said source and one end adjacent said strip, said image receiving fiber having one end adjacent said sensing means and one end adjacent said strip, each said fiber having a first portion co-axial with said common axis and a second portion off-set from said axis, said second portions being equally off-set from said axis and including said ends adjacent said strip, means for rotating synchronously each said fiber around said axis, with said ends adjacent said strip superimposed throughout said rotation, the ends of said fibers adjacent said strip describing a circle around said axis during rotation and being positioned closely adjacent to each other so that the image of the spot produced by said spot-producing fiber on a strip traveling between said ends may be received by said image-receiving fiber for transmission to said sensing means.

References Cited

UNITED STATES PATENTS

| | | | |
|---|---|---|---|
| 2,393,631 | 1/1946 | Harrison et al. | 73—159 |
| 3,192,391 | 6/1965 | Ressler | 250—227 |
| 3,210,546 | 10/1965 | Perron | 250—219 X |
| 3,330,963 | 7/1967 | O'Conner | 250—227 |
| 3,379,829 | 4/1968 | Gambrell et al. | 250—219 X |

RALPH G. NILSON, Primary Examiner

T. N. GRIGSBY, Assistant Examiner

U.S. Cl. X.R.

73—159; 250—227; 356—203

Disclaimer

3,480,786.—*Joseph J. Kottman,* Binghamton, N.Y. FLAW DETECTING SYSTEM INCLUDING SYNCHRONOUSLY ROTATING OPTIC FIBER TUBES. Patent dated Nov. 25, 1969. Disclaimer filed Sept. 30, 1982, by the assignee, *Eastman Kodak Co.*

Hereby enters this disclaimer to all claims of said patent.

[*Official Gazette March 22, 1983.*]